(12) United States Patent
Palat et al.

(10) Patent No.: US 7,016,679 B2
(45) Date of Patent: Mar. 21, 2006

(54) MOBILE NETWORK DOMAIN HAVING A VOICE CAPABLE SERVING GPRS SUPPORT NODE

(75) Inventors: Sudeep Kumar Palat, Grange Park (GB); Hatef Yamini, Swindon (GB); Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 475 days.

(21) Appl. No.: 09/788,933

(22) Filed: Feb. 20, 2001

(65) Prior Publication Data

US 2001/0034231 A1    Oct. 25, 2001

(30) Foreign Application Priority Data

Feb. 22, 2000  (EP)  .................................. 00301378

(51) Int. Cl.
*H04Q 7/20* (2006.01)
(52) U.S. Cl. ................ 455/436; 455/432.1; 455/432.2; 455/433; 455/435.2; 455/437; 455/438; 455/439; 455/442; 370/328; 370/331; 370/352; 370/355; 370/356
(58) Field of Classification Search ............. 455/432.1, 455/432.2, 433, 435.1, 435.2, 451, 552.1, 455/553.1, 557, 436, 437, 438, 439, 442; 370/310.2, 328, 352–357, 331
See application file for complete search history.

(56) References Cited

U.S. PATENT DOCUMENTS

| 5,818,824 | A | * | 10/1998 | Lu et al. ..................... 370/328 |
| 5,819,178 | A | * | 10/1998 | Cropper ...................... 455/433 |
| 6,064,653 | A | * | 5/2000 | Farris .......................... 370/237 |
| 6,389,008 | B1 | * | 5/2002 | Lupien et al. .............. 370/352 |

FOREIGN PATENT DOCUMENTS

| WO | WO99/12329 |   | 3/1999 |
| WO | WO99-12329 | * | 3/1999 |
| WO | WO99-1626 | * | 4/1999 |
| WO | WO99/16266 |   | 4/1999 |

OTHER PUBLICATIONS

Design Of An Internet Fax and Voice Gateway, S. Foo, C. K. Yeo, S. C. Hui, D.H. Xue, Microprocessors and Microsystems 22 (1999) 395-402.
European Search Report dated Jul. 27, 2000.

* cited by examiner

Primary Examiner—Stephen D'Agosta

(57) ABSTRACT

A mobile telephone network provides a network operator domain in which the output from a radio network controller (RAN) is processed by a voice capable serving GPRS support mode (VC-SGSN). The VC-SGSN consists of the combination of a voice service box (VSB) and a service GPRS support node (SGSN). The VSB and the SGSN can jointly access the same home location register). The output of the SGSN can be forwarded to the internet via a gateway GPRS support node while the output of the VSB can be forwarded to the public switched telephone network (PSTN).

4 Claims, 4 Drawing Sheets

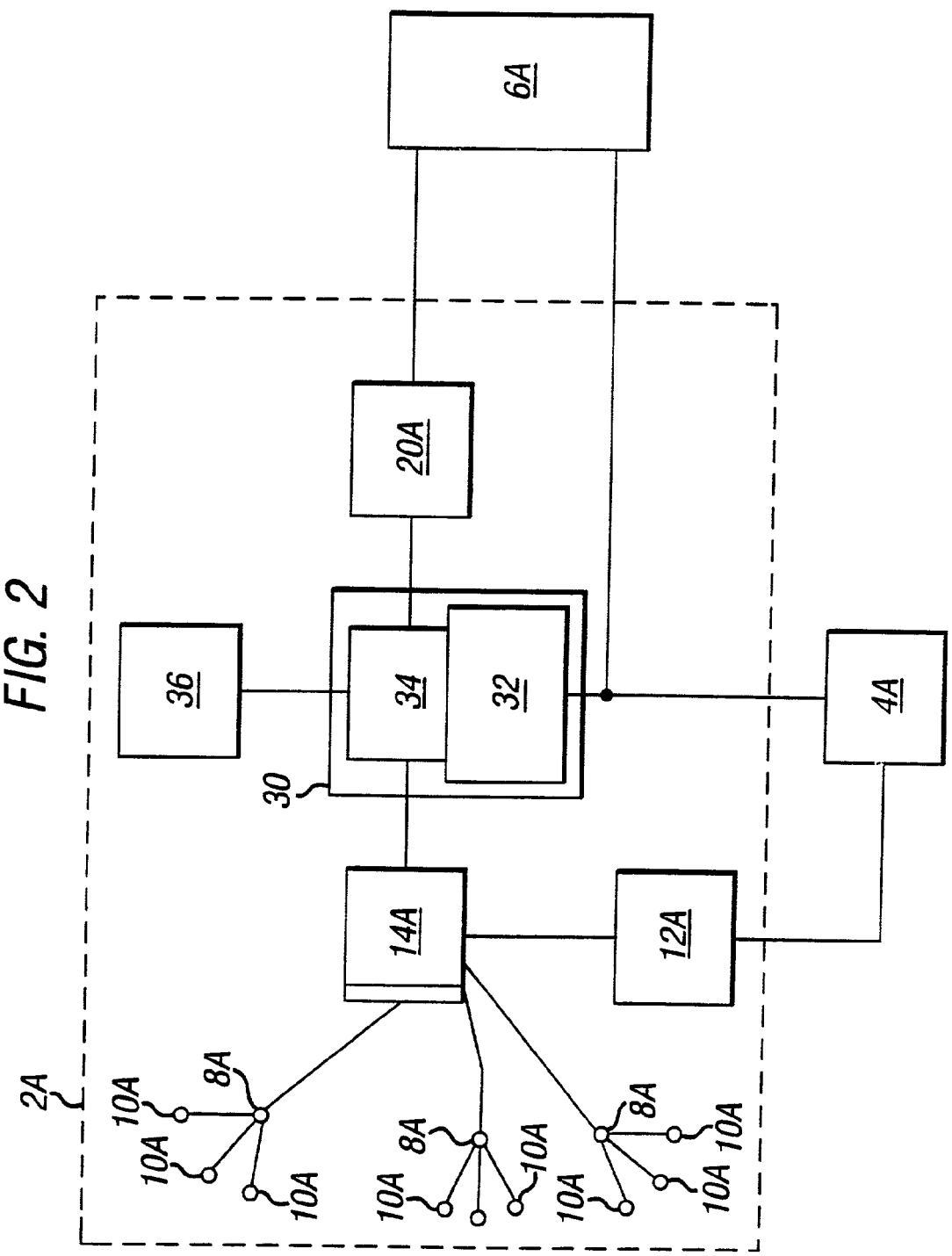

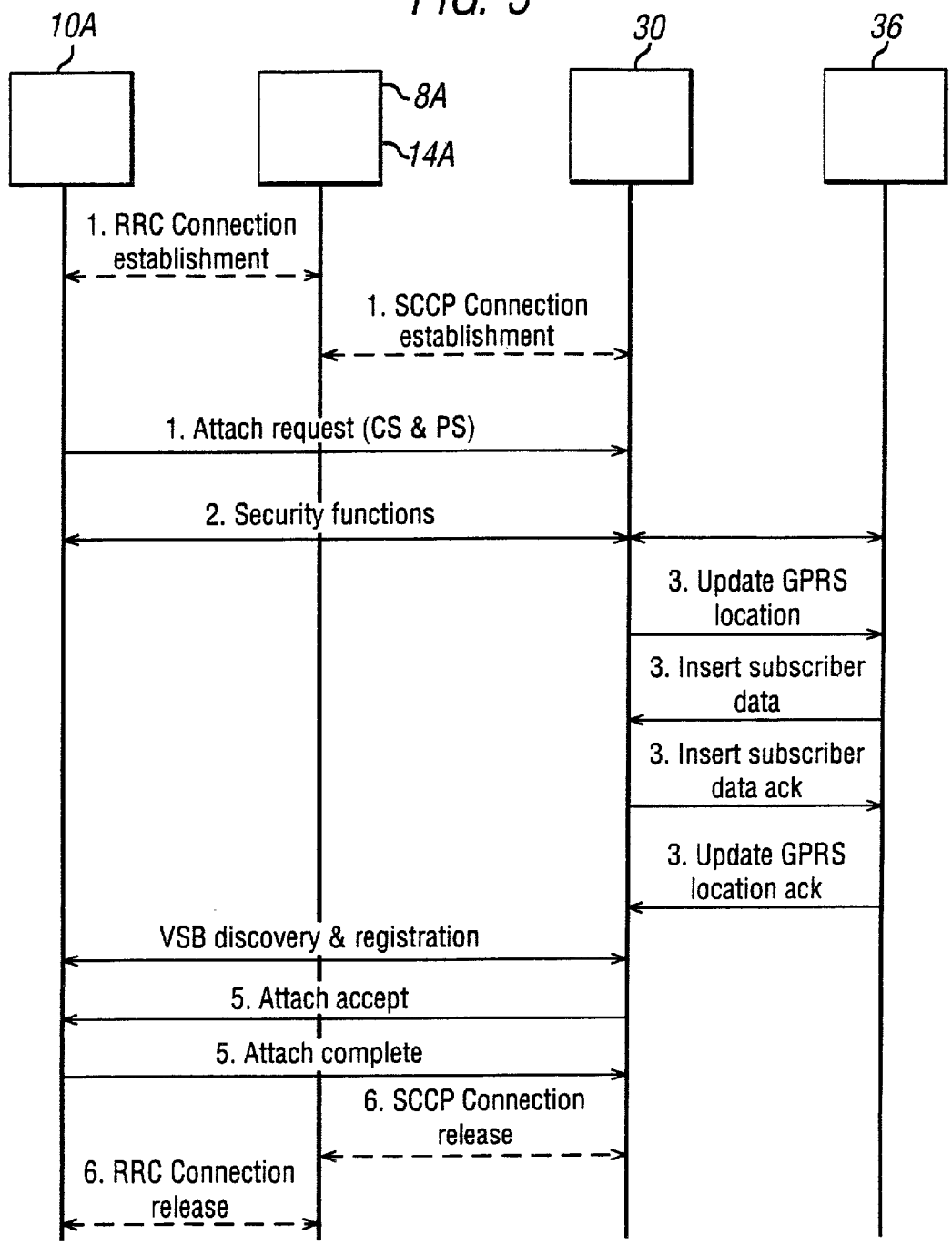

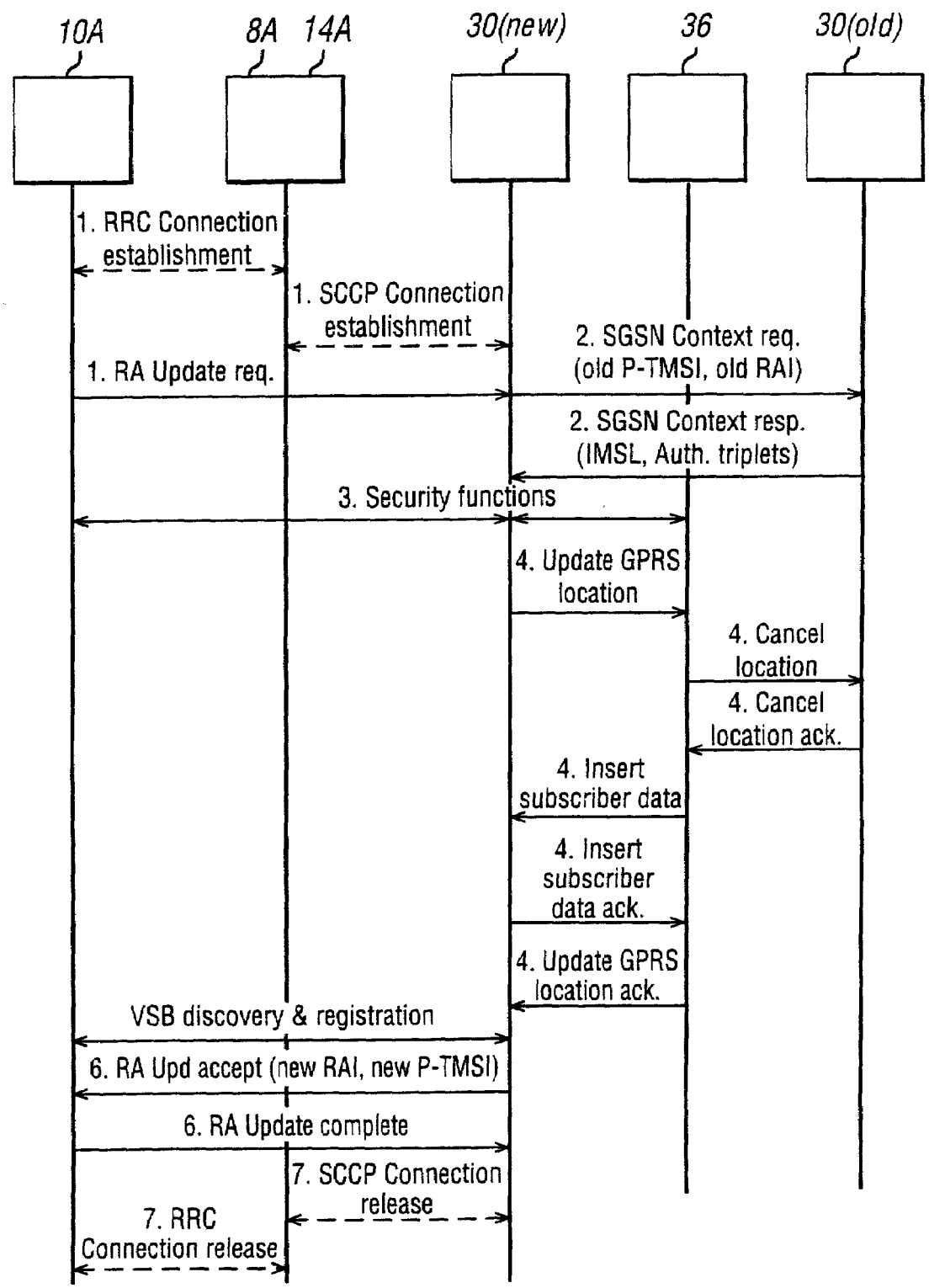

MOBILE NETWORK DOMAIN HAVING A VOICE CAPABLE SERVING GPRS SUPPORT NODE

CROSS-REFERENCE TO RELATED APPLICATION

This application claims priority of European Patent Application No. 00301378.6, which was filed on Feb. 22, 2000.

BACKGROUND OF THE INVENTION

1. Field of the Invention

The present invention relates to mobile telephone networks.

2. Description of the Related Art

FIG. 1 is a block diagram of a currently proposed GSM/GPRS or UMTS network. Each mobile operator has a domain 2 which is connected to transmit and receive signals data to and from the public switched network (PSTB) 4 and the Internet 6.

A domain typically consists of a plurality of nodes 8 (commonly known as node B's) distributed over a region through which a plurality of user equipments (UE's) such as mobile telephones 10 are located or travel through. Each node 8 can connect with a mobile UE 10 in its viscinity.

The nodes 8 are connected to a radio network controller 14 (RNC). The RNC 14 is connected to a mobile switching center 12 (MSC) and a servicing GPR support node 16 (SGSN). The RNC 14 directs non-packet data to the MSC 12 while the RNC directs packet data to the SGSN 16. The MSC 12 is connected to the PSTN and the SGSN is connected to a gateway GPRS support node 20 (GGSN).

Data relating to the caller or subscriber is held in a home location register 18 (HLR) which the SGSN 16 and the MSC 12 is able to access. The HLR 18 holds all the subscriber details to enable verification and billing and list all the subscriber service requirements. For access to the Internet, the user attaches to the SGSN and activates a packet data control (PDP) context.

Once the SGSN has accessed the HLR 18, obtained the data needed and performed the necessary checks, it will connect with the gateway GPRS support node 20 (GGSN) which will perform the final link in connecting the subscriber of each mobile UE 10 with the Internet 6.

Where voice services are required, the GGSN will connect to a voice service box 22 (VSB). Because the VSB may lie outside the mobile UE operators domain 2, it must have access to its own home location register 24 (HLR) with which the user has subscribed so that it can provide the necessary services. Thus, the VSB 22 determines from the HLR 24 the subscriber requirements eg voice mail, call waiting, call forwarding and call charging regime so that the subscriber receives his requested services and is billed accordingly depending upon such factors as the ultimate location of his target subscriber.

Each mobile UE 10 is capable of using packet domain control protocols in order to set up bearers to the VSB 22.

This mode of operation, where voice services are provided transparently within the PLMN, has several limitations. The VSB 22, while knowing the subscriber identity, does not know his location since this can only be determined within the domain 2 and so services such as free local calls cannot be processed. Also, police security checks cannot be made to trace the location of the caller from outside the location of the domain.

Secondly, the current architecture potentially requires that two sets of subscriber data be held at two physically different places and which may be owned by different proprietors. If a common HLR is used for holding of the entire subscriber data, an extra signalling load is imposed on this network element. Additionally, the call stale control function (CSCF) (which is part of the VSB) may require that an additional mechanism is used to authenticate the user.

Thirdly, the current transparent model may potentially have a problem if serving RNC (SRNS) relocation happens in the middle of a call. This can result in a break in transmission which can lead to a lowering of perceived quality of the voice service. Additionally, if the call is required to be relocated to a circuit switched (CS) only network, a multitude of problems arise eg how to signal to the CSCF to start acting as an MSC anchoring the call, how to tear down existing sessions, etc.

Fourthly, for terminating voice calls to be supported, a packet data protocol (PDP) context is required to be maintained between the UE, SGSN and GGSN. This can impose an overhead on the network elements, and (potentially) over the radio interface. The alternative approach of having a statically assigned Internet protocol (IP) address, and using the network initiated PDP context activation procedure would lead to an increase in the delay for terminating calls, and could lead to address shortage problems in the future.

These problems are solved with the network shown in FIG. 2 in which parts similar to those in FIG. 1 are similarly referenced but with the suffix A.

SUMMARY OF THE INVENTION

According to the present invention there is provided a mobile network domain comprising a radio network controller (RNC) for supplying signals derived from user equipment, in packet form, a voice capable serving GPRS (general packet radio system) support node (VC-SGSN) for receiving signals from the RNC and processing both voice call control and non-voice packet signals, a gateway GPRS support node (GGSN) for receiving non-voice packet signals processed by the VC-SGSN and forwarding them out of the domain, and a home location register (HLR) containing subscriber identity, service and billing requirements, the VC-SGSN comprising the combination of a servicing GPRS support node (SGSN) and a voice service box (VSB) both of which can communicate with the HLR to access data therein and to transfer data thereto, the VSB receiving and processing voice call control packet signals and when processed forwarding this out of the domain. The RNC may include a third generation USTM (universal mobile telecommunication system) RNC or a second generation GPRS base station controller (BSC).

BRIEF DESCRIPTION OF THE DRAWINGS

A mobile network embodying the present invention will now be described, by way of example, with reference to the accompanying drawings, in which:

FIG. 2 is a block diagram of a mobile network embodying the present invention;

FIG. 3 is a sequencing chart illustrating the sequence of attach and registration procedures for the network of FIG. 2; and FIG. 4 is a sequence chart illustrating the sequence for transferring registration from one VC-SGSN to another.

DETAILED DESCRIPTION

Figure 1:
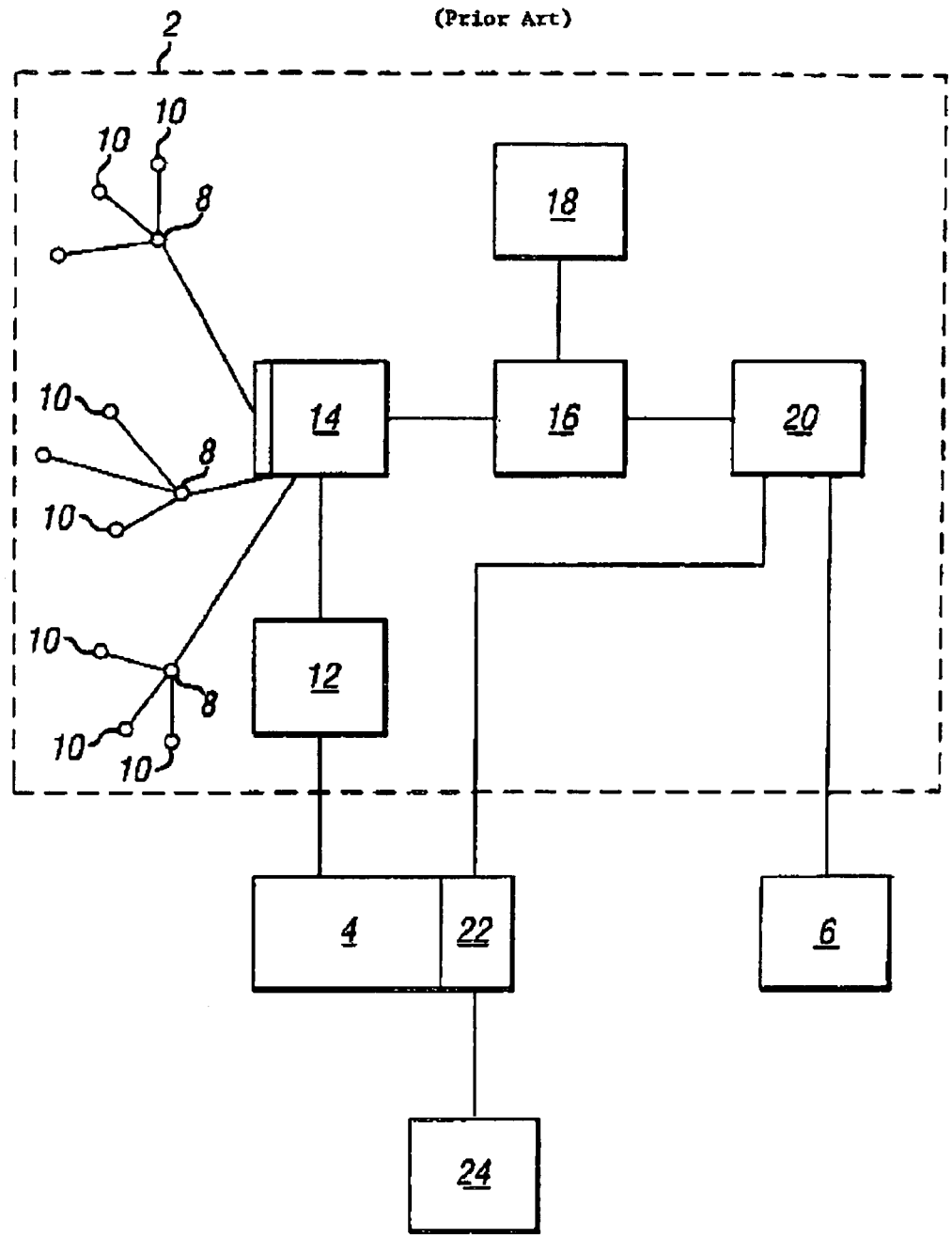
FIG. 1 is a block diagram of a previously proposed telephone network.

Second generation GSM/GPRS (global systems for mobile communication/general packet radio system) mobile networks and third generation UMTS (universal mobile telecommunication system) mobile networks transmit data in discrete packets. Where such packets are required to carry voice data, provision needs to be made for a voice service box (VSB) which is structured to handle the voice data.

It is an object of the invention to provide an improved mobile telephone system.

As shown in FIG. 2, the SGSN of FIG. 1 has been replaced by a voice capable SGSN 30 (VC-SGSN). As shown, the VC-SGSN 30 includes a voice service box 32 (VSB) combined with an SGSN 34. The two devices 32 and 34 may be directly connected together or actually integrated with each other. The two HLRs 18 and 24 of FIG. 1 have been replaced by a common HLR 36, which directly feeds the SGSN 34 and the VSB 32 of the VC-SGSN 30 with the necessary data. The VSB 34 is thus now located within the domain 2A of the mobile telephone operator. The output of the VSB 32 is directly connected to the public switched telephone network (PSTN) 4A and/or the Internet.

The HLR 36 is capable of storing information pertaining to the mobile subscribers subscription with the PLMN 2A and the voice services related to the VSB 32 as well as location information of the subscriber. Hence, one common set of subscriber data is held at the HLR to be transferred to the VC-SGSN.

It will be appreciated that the VSB 32 may be directly connected to or integrated with another SGSN (not shown) located within the same domain 2A. Thus, in this case the two SGSNs will share a common VSB 32 as well as a common HLR 36.

When a mobile 10A attaches itself to the domain 2A, an RRC connection is established across the radio interface, and a signalling connection control part (SCCP) connection is established from the radio network controller 14A (RNC) and the VC-SGSN 30. This connection is used for PLMN authentication, temporary identity allocation, and ciphering key notification. If a combined attach procedure is used (i.e. for both packet and voice services), this connection should be maintained and used for the CSCF discovery and registration procedure with the VSB 32. A parameter is included in a session management (SM) or mobility management (MM) message to a combined attach. The VC-SGSN 30 interprets this message and uses the collocated CSCF to serve this mobile 10A. The IP address of this CSCF will then be sent back to mobile 10A using the existing signalling connection. One registration is complete with the VSB, the attached complete message is sent and the radio resource control (RRC) and SCCP context can be torn down.

This protocol is more clearly illustrated in FIG. 3 in six distinct steps, which occur as follows:

Step 1 RRC connection and SCCP connection set up, and combined attach request message is sent over connection.

Step 2 PLMN specific security functions are executed.

Step 3 VC-SGSN 30 contacts the HLR 36 to update the location. Subscription data related to both packet and voice services are downloaded from the HLR 36 to the VC-SGSN 30.

Step 4 VSB 32 discover and registration procedures are carried out over the signalling connection as described above.

Step 5 Attach accept is returned back to the mobile 10a and confirmed by the mobile 10a.

Step 6 Connections are released.

At this point, mobile 10A can be considered to be in idle mode. This means that when a new routing area (RA) is entered, the RA update procedure is initiated. This procedure requires similar connections (RRC and SCCP) to be set up as when attaching. Once these connections have been set up and the RA update request message has been sent, a VSB discovery message will also be sent. If the RA change has resulted in a new VC-SGSN, then the registration procedures with new VSB shall be carried out, before the RA update complete message is sent back, and the RRC and SCCP connections are torn down. Otherwise, no action is required, and the RA update complete message shall be sent back as before.

This protocol is more clearly illustrated in FIG. 4 in seven distinct steps, which occur as follows:

Step 1 RRC connection and SCCP connection are set up. RA update request is sent over connection.

Step 2 The new VC-SGSN send an SGSN context request (old P-TMSI, old RAI) to the old VC-SGSN to get the IMSI for the mobile user equipment (UE). The old VC-SGSN responds with SGSN context response (eg IMSI and authentication triplets).

Step 3 PLMN specific security functions are executed.

Step 4 New VC-SGSN contacts the HLR 36 to update the location. The HLR 36 removes contexts from old VC-SGSN, and subscription data related to both packet and voice services are downloaded from the HLR 36 to the new VC-SGSN.

Step 5 VSB discover and registration procedures are carried out.

Step 6 RA update complete is returned back to the mobile 10a and confirmed by the mobile 10a.

Step 7 Connections are released.

Changes may be made in the combination and arrangement of the elements as herein before set forth in the specification and shown in the drawings, it being understood that changes may be made in the embodiment disclosed without departing from the spirit and scope of the invention and defined in the following claims.

We claim:

1. A method or procedure for transferring from a voice capable of servicing GPRS (general packet radio system) support node (VC-SGSN), which is a first VC-SGSN, to a second VC-SGSN, the first VC-SGSN being in a mobile network domain comprising a radio network controller (RNC) for supplying signals derived from user equipment, in packet form, the voice capable serving GPRS (general packet radio system) support node (VC-SGSN) for receiving signals from the RNC and processing both voice and non-voice packet signals, a gateway GPRS support node (GGSN) for receiving non-voice packet signals processed by the VC-SGSN and forwarding them out of the domain, and a home location register (HLR) containing subscriber identity, service and billing requirements, the VC-SGSN comprising the combination of a servicing GPRS support node (SGSN) and a voice service box (VSB) both of which can communicate with the HLR to access data therein and to transfer data thereto, the VSB receiving and processing voice packet signals and when processed forwarding this out of the domain, the method comprising the steps of setting up a radio resource control (RRC) and a signaling connection control part (SCCP) connection between a said user equipment and said second VC-SGSN, sending a routing area (RA) update reguest over said connection, towards said second VCSGSN causing the second VC-SGSN to send an SGSN context reguest signal to the first VC-SGSN to cause the first VC-SGSN to forward a context response signal containing details related to the said user equipment to the second VC-SGSN, causing said second VC-SGSN execute security checks, causing said second VC-SGSN to update said HLR with the location of the user equipment, causing said HLR to remove contexts from said first VC-SGSN, causing said second VC-SGSN to download data from said HLR, effecting VSB discover and registration procedures over said connection, causing an RA update complete signal to be sent to said user equipment over said connection causing said user equipment to return an RA update complete confirmation signal over said connections to said second VC-SGSN and releasing said connection.

2. A method or procedure according to claim 1, wherein the VC-SGSN includes a second SGSN and wherein the two SGSN's share the said VSB.

3. A method or procedure according to claim 2, wherein the VSB is integrated with the or each SGSN.

4. A method or procedure according to claim 2, wherein the VSB is directly coupled to the or each SGSN.

* * * * *